(12) United States Patent
Goh et al.

(10) Patent No.: US 8,484,617 B2
(45) Date of Patent: Jul. 9, 2013

(54) PROCESS-DRIVEN FEEDBACK OF DIGITAL ASSET RE-USE

(75) Inventors: SweeFen Goh, Hawthorne, NY (US);
Richard T. Goodwin, Hawthorne, NY (US); Rakesh Mohan, Hawthorne, NY (US); Pietro Mazzoleni, Hawthorne, NY (US); Biplav Srivastava, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 994 days.

(21) Appl. No.: 12/491,693

(22) Filed: Jun. 25, 2009

(65) Prior Publication Data
US 2010/0333067 A1    Dec. 30, 2010

(51) Int. Cl.
*G06F 9/44*    (2006.01)
(52) U.S. Cl.
USPC ............................................ 717/121; 717/101
(58) Field of Classification Search
None
See application file for complete search history.

(56) References Cited

U.S. PATENT DOCUMENTS

| | | | |
|---|---|---|---|
| 5,361,355 A | 11/1994 | Kondo et al. | |
| 6,678,882 B1 | 1/2004 | Hurley et al. | |
| 7,082,573 B2 * | 7/2006 | Apparao et al. | 715/745 |
| 7,149,734 B2 | 12/2006 | Carlson et al. | |
| 7,197,466 B1 | 3/2007 | Peterson et al. | |
| 7,322,024 B2 | 1/2008 | Carlson et al. | |
| 8,037,088 B2 * | 10/2011 | Chatterjee et al. | 707/769 |
| 2003/0046282 A1 * | 3/2003 | Carlson et al. | 707/6 |
| 2006/0123388 A1 * | 6/2006 | Choi et al. | 717/101 |
| 2007/0240102 A1 * | 10/2007 | Bello et al. | 717/104 |
| 2009/0094584 A1 * | 4/2009 | Dheap et al. | 717/130 |

OTHER PUBLICATIONS

Rational Asset Manager, [online]; [retrieved on Jun. 25, 2009]; retrieved from the Internet http://www-01.ibm.com/software/awdtools/ram/.
Rational Assset Manager: A comprehensive business scenario, [online]; [retrieved on Jun. 25, 2009]; retrieved from the Internet http://www.ibm.com/developerworks/rational/library/07/0717_antley_vogler/index.html?S_TACT=105AGX15&S_CMP=EDU.
Web services abd asset reuse, [online]; [retrieved on Jun. 25, 2009]; retrieved from the Internet http://www.ibm.com/developerworks/webservices/library/ws-assetreuse/index.html?S_TACT=105AGX04&S_CMP=EDU.

* cited by examiner

*Primary Examiner* — Elias Mamo
(74) *Attorney, Agent, or Firm* — Cantor Colburn LLP; William Stock

(57) ABSTRACT

Methods, systems and computer program products for process driven feedback of digital asset reuse. Exemplary embodiments include a method for process-driven feedback for a digital asset, the method including identifying the asset downloaded in a computer system from a repository operatively coupled to the computer system, and for a current project within the computer system for the current project, determining whether the asset has been consumed within the current project, determining feedback and changes between the asset prior to the current project and after the current project, consolidating the feedback and the changes associated with the asset and automatically generating feedback for the asset repository so that the feedback and changes are associated with the asset for comparison in a future project similar to the current project.

19 Claims, 9 Drawing Sheets

| | PROJECT-BASED ASSETS REUSE | | | | POTENTIAL FEEDBACK |
|---|---|---|---|---|---|
| DOWNLOADED | NOT USED | | | | • ASSET SEARCH IS NOT EFFICIENT<br>• REPOSITORY CLASSIFICATION DOESN'T REFLECT USER NEEDS |
| | USED | NOT CHANGED | | | • ASSET HAS BEEN REUSED<br>• REPOSITORY CLASSIFICATION REFLECTS USER NEEDS |
| | | CHANGED | CONTEXT CHANGES | | • ASSET HAS BEEN REUSED<br>• REPOSITORY CLASSIFICATION DOESN'T REFLECTS USER NEEDS |
| | | | DROP ARTIFACTS | | • ASSET HAS BEEN REUSED<br>• ASSET IS TOO COMPLEX WITH RESPECT OF USER NEEDS<br>• ASSETS ARTIFACTS ARE NOT CORRECTLY PACKAGED |
| | | | NEW ARTIFACTS | | • ASSET HAS BEEN REUSED<br>• ASSET IS NOT COMPLETE ENOUGH |
| | | | CHANGE ARTIFACTS | CONTEXT CHANGES | • ASSET HAS BEEN REUSED<br>• ASSET IS NOT PACKAGED CORRECTLY |
| | | | | CONTENT CHANGES | • ASSET HAS BEEN REUSED<br>• ASSET ARTIFACT SHOULD BE EXTENDED (E.G. MISSING ELEMENTS)<br>• ASSET ARTIFACT SHOULD BE REVISED (E.G. CONTAINS ERRORS) |
| NOT DOWNLOADED | NOT RELEVANT | | | | • NO FEEDBACK |
| | RELEVANT | | | | • ASSET SEARCH IS NOT EFFICIENT<br>• LOST OF OPPORTUNITY |

FIG. 11

PROCESS-DRIVEN FEEDBACK OF DIGITAL ASSET RE-USE

BACKGROUND

The present invention relates to reusable assets, and more specifically, to methods, systems and computer program products for process-driven feedback for reusable digital assets.

Digital assets are reusable components that provide solutions to recurring issues in Information Technology (IT) projects. Digital assets can be composed by one or more artifacts, which are any work products from a software development lifecycle, such as requirements documents, models, process specification, source code files, deployment descriptors, test cases or scripts. An asset can be classified from one or more perspectives (i.e., metadata) that help to identify the context of use in which the assets can be searched and used. Assets can be linked together to reflect a relationship the assets possess. Assets can include design assets, which are written documents that describe general solutions to design problems that recur repeatedly in many projects; tools, which are a set of assets that aid in development or recreation of an application or task; and components (services), which are identifiable parts of a larger program or construction. Assets can offer multiple benefits including: cost and complexity reduction of compliance with secure intellectual property sharing; unification of disparate teams and rework elimination by providing secure asset tracking, by managing assets and artifacts interdependencies and relationships and by monitoring asset utilization; and information storage that is useful for collaborating on software development of assets.

Assets can impact all phases of an IT project lifecycle. The context of use for assets can be broadly defined by business-processes or other models set by software vendors as well as some standards (e.g., SAP, Oracle, Ontology, APQC, ISO-Standard, OMG Reusable Asset Specification). However, the context of use can be specific to a project (e.g. engagement). "Consuming an Asset" represents the acts of identifying, selecting, downloading, importing, and manipulating assets to productive use. Often times, when downloaded as part of a project, users can change assets to reflect specific project needs. Changes can be many-fold and concern both assets content and metadata and artifacts. In addition, users may realize changes on the artifacts composing an asset.

There is not an integrated method or system to automatically identify and manage changes on assets and artifacts on a per-project based. Feedback about asset and artifact content changes is dependent on a single user's ability and willingness to enter feedback about the asset and artifact changes. Similarly, feedback on asset metadata is currently unstructured tags with no direct relation with the context of use (i.e. business processes) in which assets and artifacts have been used for a project. In addition, while many users might make some changes on assets, not all users might have the skills (or interest) to report feedback on those changes back to the asset registry. Therefore, potentially valuable feedback remains hidden within the projects and not used to improve the management of assets.

SUMMARY

Exemplary embodiments include a method for process-driven feedback for a digital asset, the method including identifying the asset downloaded in a computer system from a repository operatively coupled to the computer system, and for a current project within the computer system for the current project, determining whether the asset has been consumed within the current project, determining feedback and changes between the asset prior to the current project and after the current project, consolidating the feedback and the changes associated with the asset and automatically generating feedback for the asset repository so that the feedback and changes are associated with the asset for comparison in a future project similar to the current project.

Additional exemplary embodiments include a computer program product for process-driven feedback for an asset in a computer system having an asset repository, the asset consumed in a current project, the computer program product including instructions for causing a computer to implement a method, the method including identifying the asset downloaded for the project, determining whether the asset has been consumed within the current project, determining feedback and changes between the asset prior to the current project and after the current project, consolidating the feedback and the changes associated with the asset and automatically generating feedback for the asset repository so that the feedback and changes are associated with the asset for comparison in a future project similar to the current project.

Further exemplary embodiments include a system for process-driven feedback for an asset within the system, the system including an asset repository, a project asset analyzer operatively coupled to the asset repository, a project asset history analyzer operatively coupled to the project asset analyzer, an assets changes comparator operatively coupled to the project asset analyzer and to the project asset history analyzer and a project-based asset feedback consolidator operatively coupled to the assets changes comparator.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 11 illustrates a table illustrating an example of non-exhaustive feedback lists that can be generated based on the used of the assets during a project.

DETAILED DESCRIPTION

Exemplary embodiments include methods, systems and computer program products that automatically discover, revise, and consolidate changes on assets and artifacts on a "per-project" basis. In exemplary embodiments, the methods, systems and computer program products can be built by a set of components that analyze the implementation of assets in different phases of a project lifecycle. Assets and artifacts consumed in the project are compared with the history of assets downloaded from the assets repository (or assets used in previous phases of the project lifecycle) to identify changes that have been made (such as artifacts associated with the asset and links between assets). In exemplary embodiments, the methods, systems and computer program products revise project-based changes on prior assets and artifacts and automatically report them into the asset repository and reconcile the consumption classification consumed by a project with the classification adopted by the registry (or by a different phases of the project lifecycle) and vice-versa.

Figure 1:
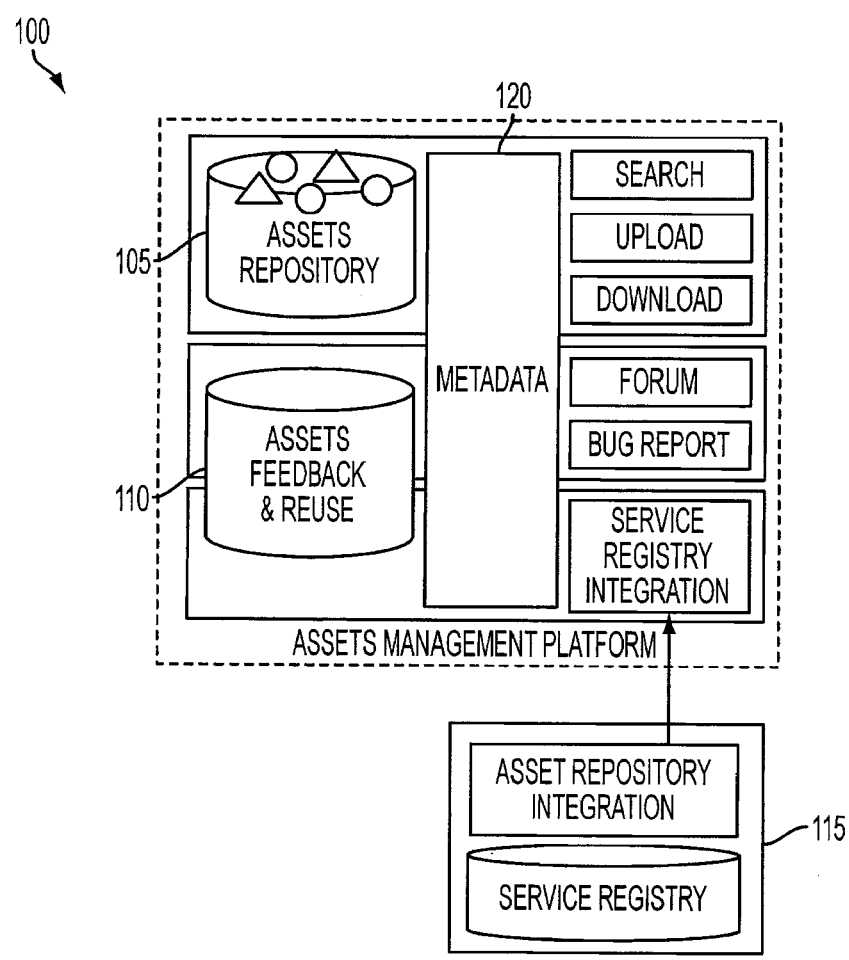
FIG. 1 illustrates an assets management platform from which assets can be retrieved and feedback can be provided for the assets in accordance with exemplary embodiments.

FIG. 1 illustrates an asset assets management platform 100 from which assets can be retrieved and feedback can be provided for the assets in accordance with exemplary embodiments. The platform 100 can include an asset repository from which assets can be searched, uploaded and downloaded to a machine (e.g., a computer) consumed in a project. As such, the asset repository 105 can manage multiple aspects of the asset lifecycle. The platform 100 can further include an assets feedback and reuse repository 110 that can receive feedback from a forum, provide bug reports and provide service registry integration. As such, the platform 100 can include an asset repository integration and service registry module 115. The platform 100 can further include metadata 120 providing information and tags about the assets in the assets repository 105. As such, extensible assets and repository metadata support flexible searches for assets. In addition, assets can be downloaded locally and integrated into the project. Users can submit feedback such as defect tracking and process automation for better control of a solution, the feedback being stored in the assets feedback and reuse repository 110. The assets repository 105 maintains the linkage between service assets deployed as part of a solution and the assets in the platform 100. Additional metadata 120 can be implemented to integrate the platform 100 with other repositories via the asset repository integration and service registry module 115.

In exemplary embodiments, the methods, systems and computer program products described herein incorporate changes on asset content back to the assets repository 105 via the assets feedback and reuse repository 110. Once an asset is downloaded, feedback on asset changes is automatic and not dependent on the ability and willingness of the individual users to provide the feedback. Feedbacks on content changes are automatically identified and submitted to the assets feedback and reuse repository 110. Since asset artifacts can be modified by multiple subjects as part of a solution, the exemplary embodiments described herein provide automatic generation of feedback related to asset artifacts. In addition, no specific user's knowledge is necessary to distinguish which changes are relevant for an asset.

In exemplary embodiments, the methods, systems and computer program products described herein further provide information about usages of design assets. Usage of service assets is automatically retrieved from the web service registry and feedback is automatically generated, which can include the downloading of an asset, even if the asset was never used or used multiple times.

In exemplary embodiments, the methods, systems and computer program products described herein incorporate feedback on assets metadata 120 to the assets feedback and reuse repository 110. Feedback on metadata are mostly unstructured tags specified by users, but can be structured in the assets feedback and reuse repository 110. Assets can be used in business processes different from the ones they were initially classified for, and therefore can be automatically organized within the assets feedback and reuse repository 110. Since artifacts can be extracted from their original assets and repackaged differently, the methods, systems and computer program products described herein can automatically track the extraction and repackaging in the assets feedback and reuse repository 110.

Figure 2:
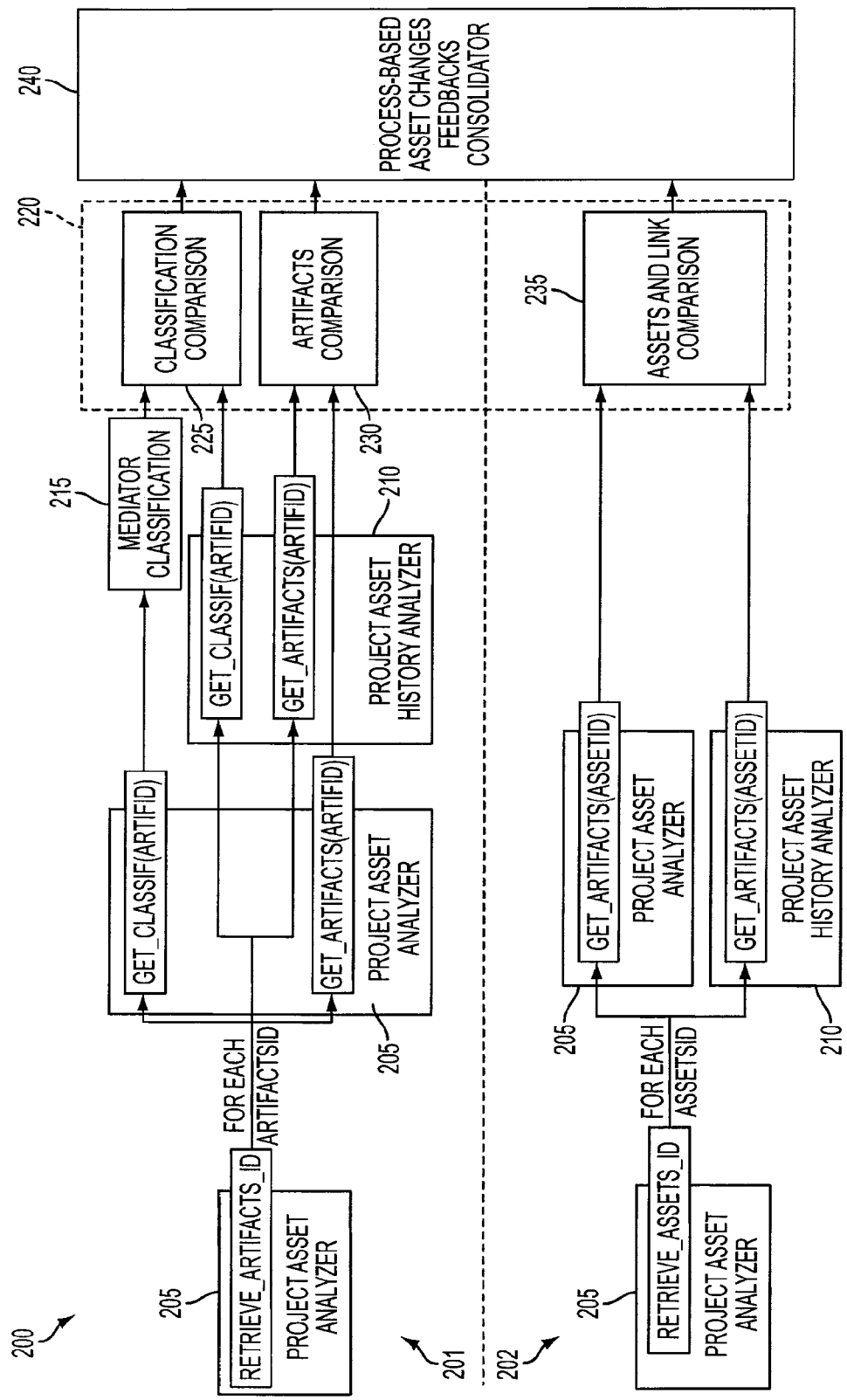
FIG. 2 illustrates a block diagram of an exemplary system for process-driven feedback of digital asset re-use.

In exemplary embodiments, the methods, systems and computer program products described herein can automatically discover assets metadata and content changes on a per project based, revise project-based assets changes prior to deploying them on the registry, provide feedback on assets reuse using the consumption classification on a per project based, automatically incorporate project-based assets changes into the asset repository, and reconcile the consumption classification used by a project with the one adopted by the registry and vice-versa FIG. 2 illustrates a block diagram of an exemplary system 200 for process-driven feedback of software asset re-use. The system 200 can include a series of components implemented in an exemplary computer system as described herein. In exemplary embodiments, the system 200 can include a project asset analyzer 205 configured to retrieve information on the usage of assets within a single project. The project asset analyzer 205 can be implemented both when assets have been used and changed in a project, and when assets have been downloaded but not used. The system 200 can further include a project asset history analyzer 210 that stores the history of the assets downloaded for a project. The project asset history analyzer 210 can be implemented both when assets have been used and changed in a project, and when assets have been downloaded but not used. The system 200 can further include a classification mediator 215 configured to synchronize classifications used by different projects and asset repositories. The system 200 can further include an asset changes comparator 220 configured to identify differences between elements as now described. The assets changes comparator 220 can include a classification comparator 225 configured to discover new classifications adopted for an asset or an artifact within a project. The assets changes comparator 220 can further include an artifacts comparator 230 configured to identify content changes of an artifact and can distinguish classes of changes (e.g., major, minor, extension). The asset changes comparator 220 can further include an asset comparator 235 configured to discover if new artifacts have been added to the asset, and discover if existing artifacts have been removed from an asset when used in a project. The system 200 can further include a project-based asset feedback consolidator 240 configured to support revisions on changes in artifacts and assets prior to deploying them in the repository. (e.g., the asset repository 105 of FIG. 1). In exemplary embodiments, a first portion 201 of the system 200 can be implemented to track which assets have been downloaded and changed during the course of the project, and a second portion 202 of the system 200 can be implemented to track which assets have been downloaded but not used during the course of the project.

Figure 3:
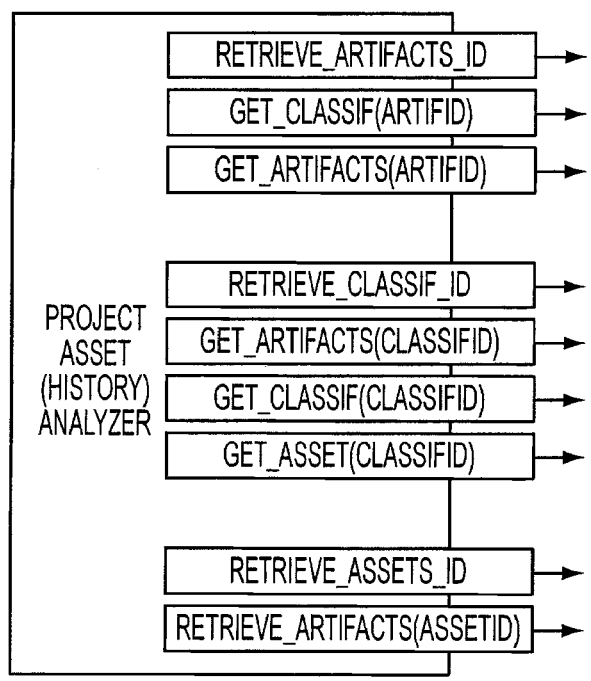
FIG. 3 illustrates a block diagram of an exemplary projects asset (history) analyzer.

FIG. 3 illustrates a block diagram of an exemplary project asset (history) analyzer. In exemplary embodiments, the project asset analyzer 205 and project asset history analyzer 210 have similar structures as now described. For illustrative purposes the structure and function of the project asset analyzer 205 is described. As described above, the project asset analyzer 205 retrieves information on the usage of assets within a single project. In exemplary embodiments, the project asset analyzer 205 can be configured differently for different phases of the project lifecycle. The project asset analyzer 205 supports a machine-readable interface decoupling the details of the process used to retrieve the information. In exemplary embodiments, every asset and artifact of a project can be assigned an identifier that the project asset analyzer 205 can retrieve for analysis of the asset/artifact. For example, identifiers can include but are not limited to an artifacts identifier (e.g., Artifacts_ID), a classification identifier (e.g., classif_ID), and an assets identifier (e.g., Assets_ID). In exemplary embodiments, the project asset analyzer 205 can retrieve identifiers to retrieve the respective asset, artifact or classification. For example, a Retrieve_Artifacts_ID function can be implemented to obtain artifacts or classifications related to the Artifacts_ID including functions such as Get_Classif(ArtifID) and Get_Artifacts(ArtifID). In another example, a function Retrieve_Classif_ID can be implemented to obtain artifacts, classifications or assets related to the Classif_ID including functions such as Get_Artifacts(ClassifID), Get_Classif(ClassifID) and Get_Asset (ClassifID). In another example, a function Retrieve_Assets_ID can be implemented to obtain artifacts related to the Assets_ID including a function Get_Artifacts(AssetID).

Figure 4:
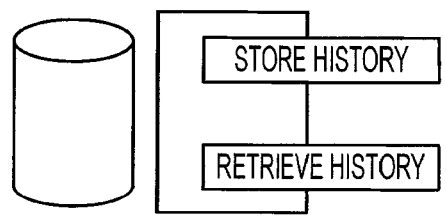
FIG. 4 illustrates a block diagram of an exemplary project asset history repository.

In exemplary embodiments, the project asset history analyzer 210 is implemented to analyze the history of the assets related to downloads and usage. FIG. 4 illustrates a block diagram of an exemplary project asset history repository 400 in which the history of downloading, uploading and usage can be stored and retrieved. In exemplary embodiments, the project asset history repository 400 is operatively coupled to the project asset history analyzer 210. In exemplary embodiments, the project asset history repository 400 can be: maintained by the asset repository (such as the asset repository 105 in FIG. 1), integrated within individual artifacts or, stored locally to the project such as in a computer system.

Figure 5:
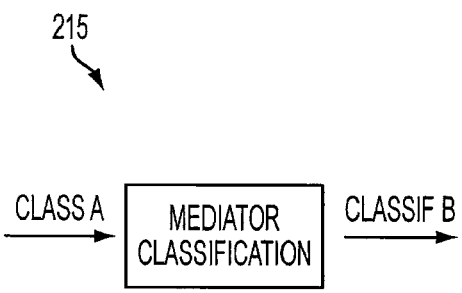
FIG. 5 illustrates a block diagram of an exemplary classification mediator.

FIG. 5 illustrates a block diagram of an exemplary classification mediator 215. As described above, the classification mediator 215 synchronizes classifications used by different projects and asset repositories.

Figure 6:
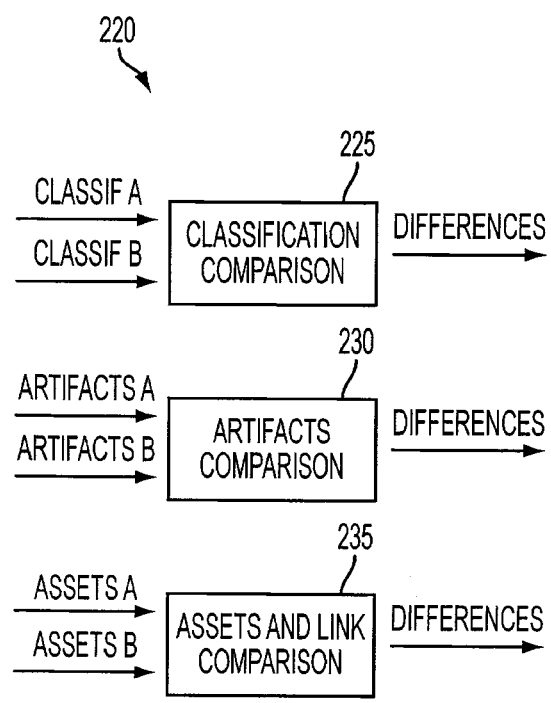
FIG. 6 illustrates a block diagram of an exemplary asset changes comparator.

FIG. 6 illustrates a block diagram of an exemplary asset changes comparator 220. As described above, the asset changes comparator 220 identifies differences among two elements (i.e., two different assets, two different classifications, two different artifacts). The asset changes comparator 220 can discover new classifications adopted for an asset or an artifact within a project. The asset changes comparator 220 can further identify the content changes of an artifact, and can distinguish classes of changes (e.g., major, minor, extension). The asset changes comparator can further discovers if new artifacts have been added to the asset, and can discover if existing artifacts have been removed from an asset when used in a project. Multiple approaches can be used for discovering the changes. Among others, existing text analysis techniques can be used to compare asset content whereas existing data mapping techniques can be used to compare classifications.

Figure 7:
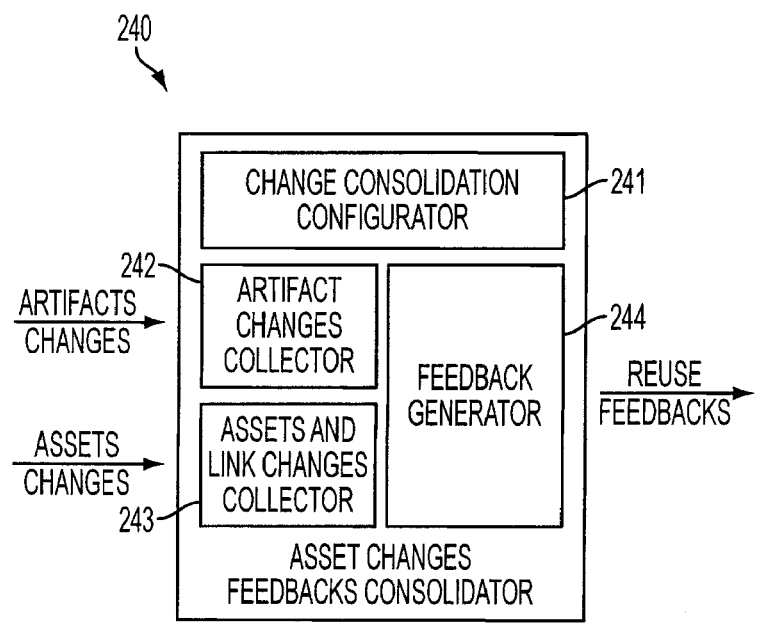
FIG. 7 illustrates a block diagram of an exemplary asset changes feedback consolidator.

FIG. 7 illustrates a block diagram of an exemplary asset changes feedback consolidator 240. As described above, the asset changes feedback consolidator 240 supports revisions on changes in artifacts and assets prior to deploying the changes for storage. The asset changes feedback consolidator 240 can include several components such as, but not limited to: a change consolidation configurator 241; an artifact changes collector 242; an assets changes collector 243; and a feedback generator 244. The asset changes feedback consolidator 240 can consolidate changes performed on multiple projects. The asset changes feedback consolidator 240 can be customized to, for example, automatically submit changes with no revisions. Pre-existing features of asset repository systems can be invoked by the feedback consolidator. In addition, the asset changes feedback consolidator 240 supports additional metadata (e.g., project name, the subject that performed the change) sent along with the change to provide additional feedback for future consumption of the asset.

Figure 8:
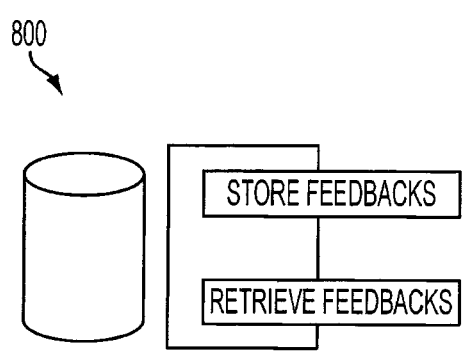
FIG. 8 illustrates a block diagram of an exemplary project-based assets feedback repository.

FIG. 8 illustrates a block diagram of an exemplary project-based assets feedback repository 800. In exemplary embodiments, the exemplary project-based assets feedback repository 800 can be operatively coupled to the asset changes feedback consolidator 240 to store the feedback and metadata on the artifacts and assets as described herein. In exemplary embodiments, the project-based assets feedback repository 800 can be deployed in the asset repository (e.g., the asset repository 105 of FIG. 1) or locally to the project on a computer. The project-based assets feedback repository 800 can also be implemented as additional input for our methodology as it supports the same functions defined for the project asset analyzer 205 and the project asset history analyzer 210.

Figure 9:
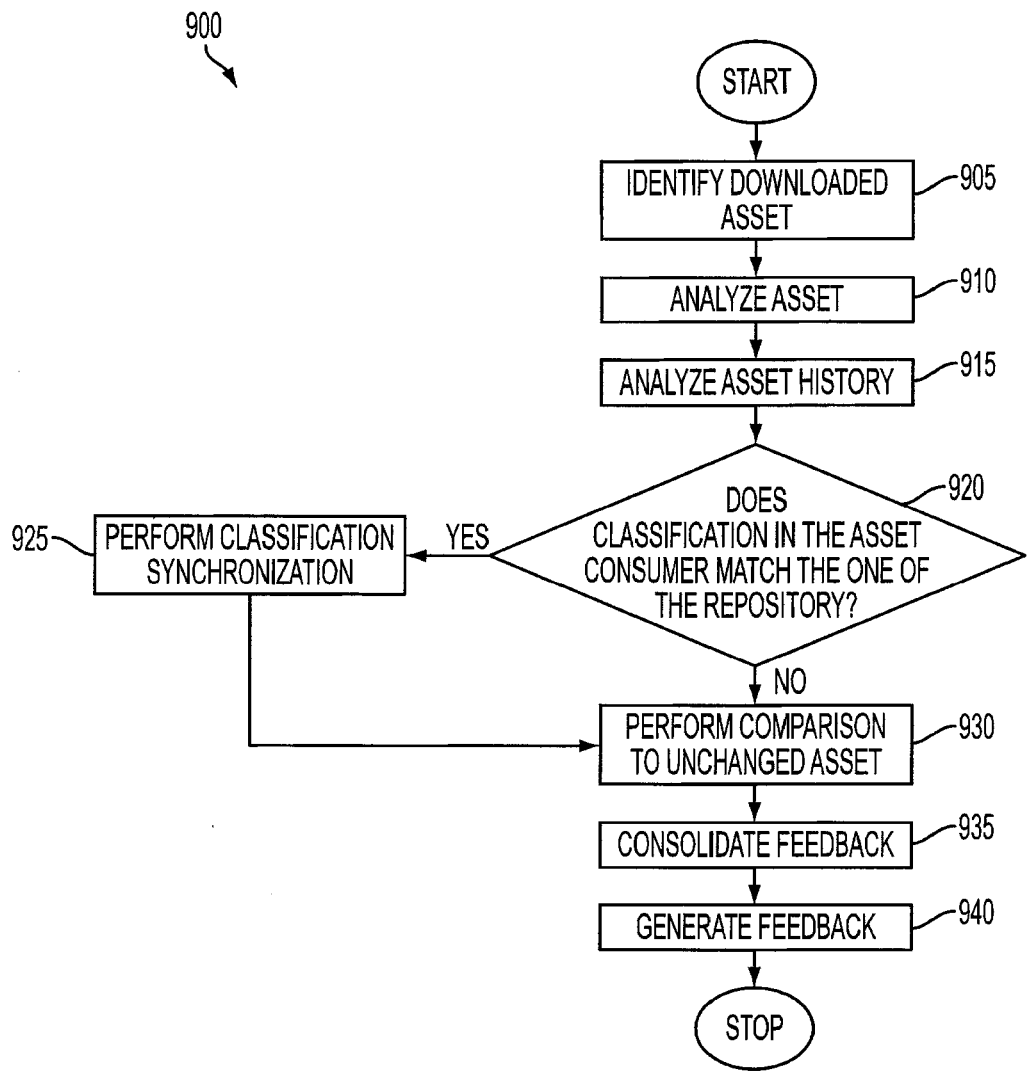
FIG. 9 illustrates a flow chart of a method 900 for generating process-driven feedback for reusable assets in accordance with exemplary embodiments.

FIG. 9 illustrates a flow chart of a method 900 for generating process-driven feedback for reusable assets in accordance with exemplary embodiments. In exemplary embodiments, the method 900 can be implemented each time an asset is downloaded, and/or can be implemented a given project's completion when all assets for the project have been downloaded. In a project, an asset can be downloaded for multiple purposes. As example, a business consultant could query the asset repository to download and reuse deliverables created from previous projects. At block 905, the system 200 identifies an asset or multiple assets that have been downloaded. At block 910, the system 200 implements that project asset analyzers 205 to analyze the asset, and at block 915, the system 200 implements the project asset history analyzers 210 to analyze the history of the asset. Existing text analysis techniques can be used to search changed in the content the of asset. At block 920 the system 200 determines whether or not the asset has been used in the project. As described herein, the system 200 implements portion 201 for those assets that have been used and changed during the course of the project, and implements portion 202 for those assets that have been downloaded but have not be used or changed during the course of the project. If at block 920, the asset has been used, a classification synchronization is performed at block 925 such that classifications by different projects and repositories can be synchronized such that changes to the assets are properly tracked. Regardless of whether or not the assets have been used in the project, at block 930, a comparison is performed between the assets prior to the change and after the change. At block 935, changes and feedback gathered at block 930 are consolidated and feedback is automatically generated at block 940. In exemplary embodiments, there are several types of feedback that can be generated based on the status of changes and use of an asset.

Figure 10:
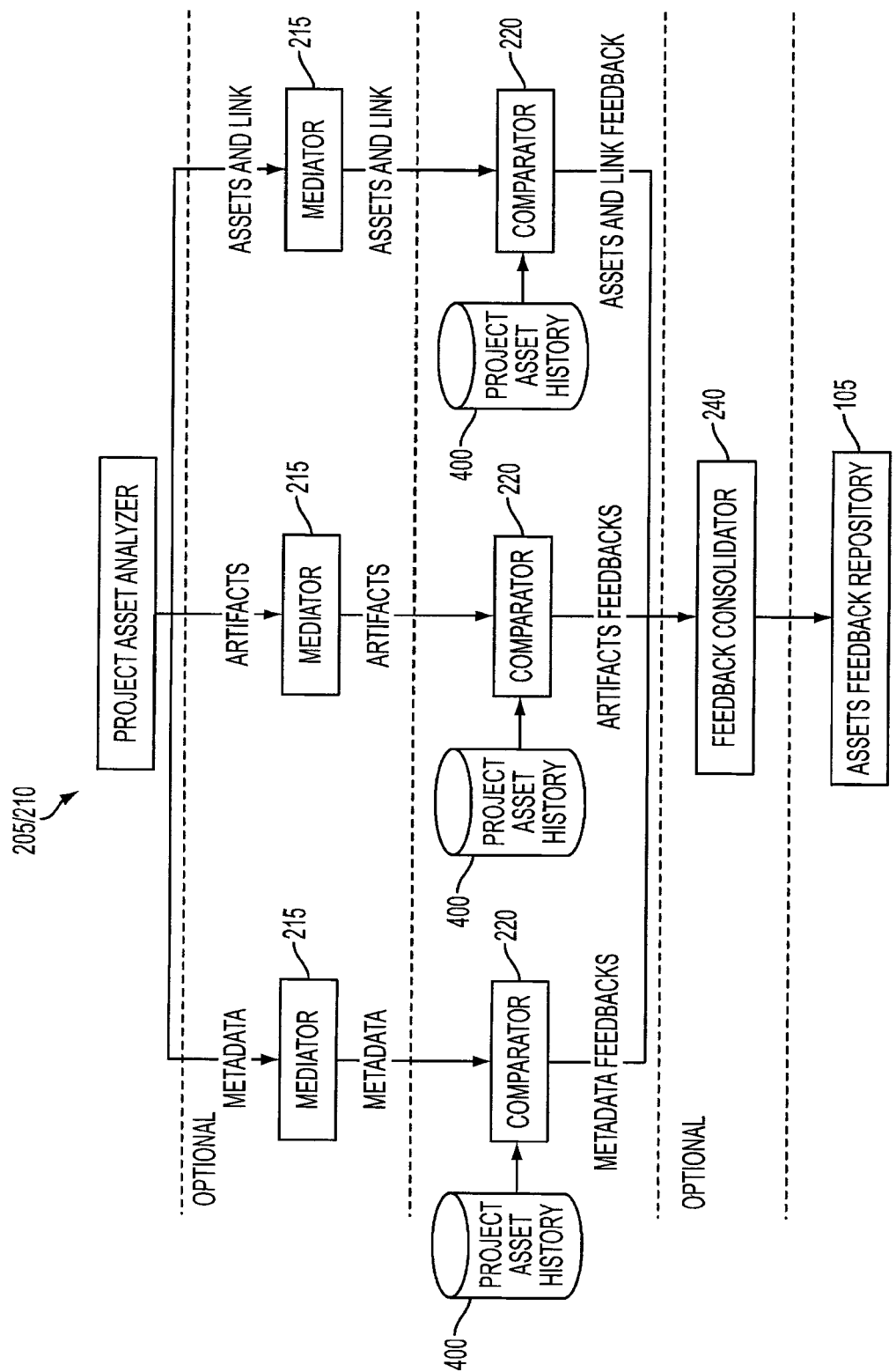
FIG. 10 illustrates an example flow in an exemplary feedback system in accordance with exemplary embodiments.

FIG. 10 illustrates an example flow in an exemplary feedback system in accordance with exemplary embodiments. As described above, the project asset analyzer 205 retrieves information on the usage of assets within a single project. The project asset analyzer 205 can be implemented both when assets have been used and changed in a project, and when assets have been downloaded but not used. The classification mediator 215 synchronizes classifications used by different projects and asset repositories. As seen in FIG. 10 the classification mediator 215 can separately synchronize the different changes to the asset, including the metadata, artifacts and assets and link information. The asset changes comparator 220 identifies differences between elements such as the metadata feedback, artifact feedback and assets and link feedback as shown. The project asset history repository 400 in which the history of downloading, uploading and usage can be stored and retrieved, is operatively coupled to the comparator 220. The asset feedback consolidator 240 supports revisions on changes in artifacts and assets prior deploying them in the asset repository 105. The method 900 can repeat for multiple assets in a project.

FIG. 11 illustrates a table 1000 illustrating an example of non-exhaustive feedback lists that can be generated based on the used of the assets during a project. Asset reuse changes can include but are not limited to the asset: not used, not changed, not downloaded, having context changes, having content changes, and having changed/dropped artifacts. The potential feedback for an asset can include but is not limited to that the asset: has been reused, requires a more efficient search criteria, needs correct packaging, needs revision/extension, and needs a classification revision.

Figure 12:
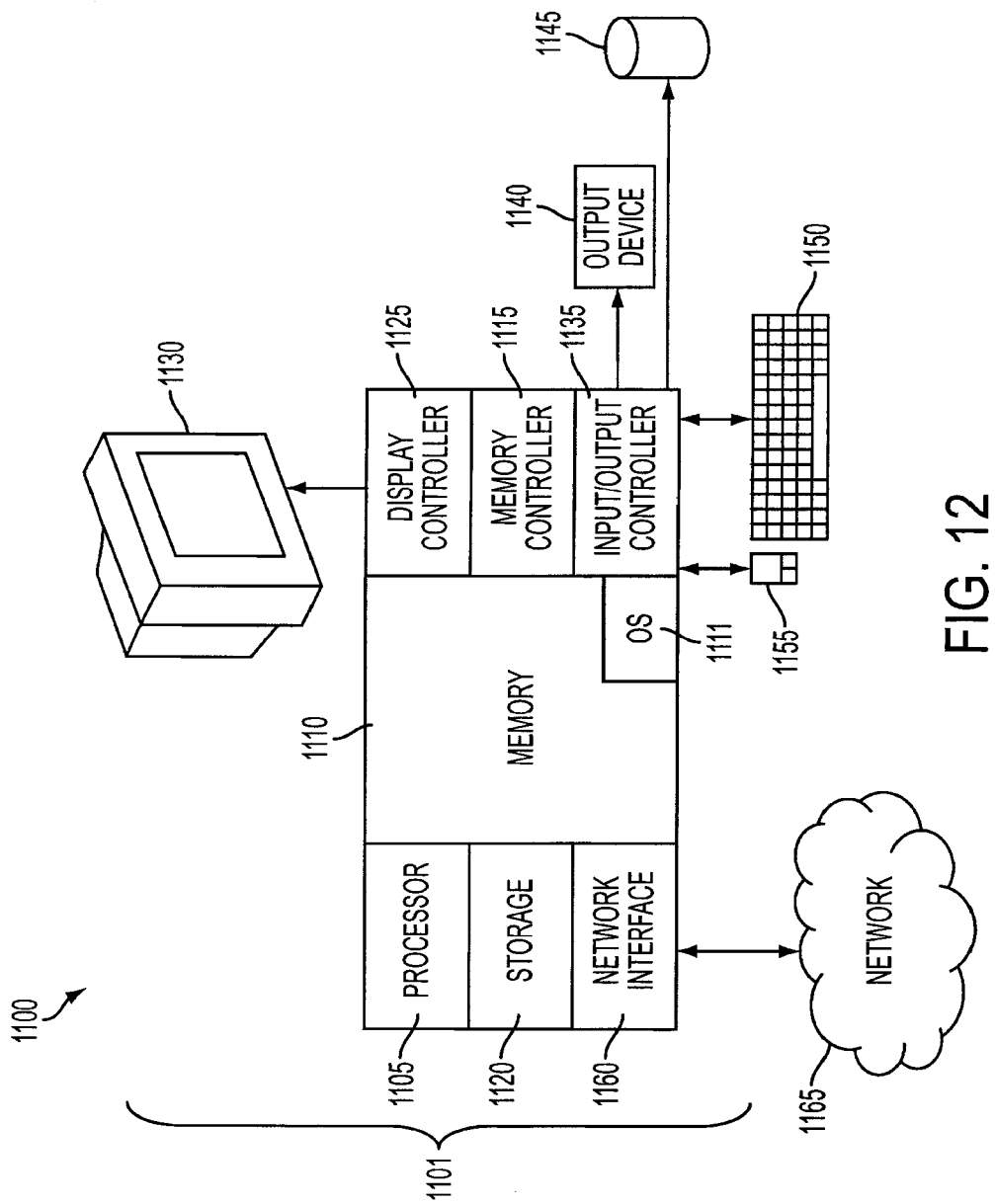
FIG. 12 illustrates an exemplary embodiment of a system for generating process-driven feedback for reusable assets.

The exemplary embodiments described herein can advantageously be implemented in a computer system as now described. For example, the system 200 can be a series of software components in the memory 1110 described below. FIG. 12 illustrates an exemplary embodiment of a system 1100 for generating process-driven feedback for reusable assets. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 1100 therefore includes general-purpose computer 1101.

In exemplary embodiments, in terms of hardware architecture, as shown in FIG. 12, the computer 1101 includes a processor 1105, memory 1110 coupled to a memory controller 1115, and one or more input and/or output (I/O) devices 1140, 1145 (or peripherals) that are communicatively coupled via a local input/output controller 1135. The input/output controller 1135 can be, for example but not limited to, one or more buses or other wired or wireless connections, as is known in the art. The input/output controller 1135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 1105 is a hardware device for executing software, particularly that stored in memory 1110. The processor 1105 can be any custom made or commercially available processor, a central processing unit (CPU), an auxiliary processor among several processors associated with the computer 1101, a semiconductor based microprocessor (in the form of a microchip or chip set), a macroprocessor, or generally any device for executing software instructions.

The memory 1110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 1110 can have a distributed architecture, where various components are situated remote from one another, but can be accessed by the processor 105.

The software in memory 1110 may include one or more separate programs, each of which comprises an ordered listing of executable instructions for implementing logical functions. In the example of FIG. 12, the software in the memory 1110 includes the process-driven feedback methods described herein in accordance with exemplary embodiments and a suitable operating system (OS) 1111. The operating system 1111 essentially controls the execution of other computer programs, such the process-driven feedback systems and methods described herein, and provides scheduling, input-output control, file and data management, memory management, and communication control and related services.

The process-driven feedback methods described herein may be in the form of a source program, executable program (object code), script, or any other entity comprising a set of instructions to be performed. When a source program, then the program needs to be translated via a compiler, assembler, interpreter, or the like, which may or may not be included within the memory 1110, so as to operate properly in connection with the OS 1111. Furthermore, the process-driven feedback methods can be written as an object oriented programming language, which has classes of data and methods, or a procedure programming language, which has routines, subroutines, and/or functions.

In exemplary embodiments, a conventional keyboard 1150 and mouse 1155 can be coupled to the input/output controller 1135. Other output devices such as the I/O devices 1140, 1145 may include input devices, for example but not limited to a printer, a scanner, microphone, and the like. Finally, the I/O devices 1140, 1145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 1100 can further include a display controller 1125 coupled to a display 1130. In exemplary embodiments, the system 100 can further include a network interface 1160 for coupling to a network 1165. The network 1165 can be an IP-based network for communication between the computer 1101 and any external server, client and the like via a broadband connection. The network 1165 transmits and receives data between the computer 1101 and external systems. In exemplary embodiments, network 1165 can be a managed IP network administered by a service provider. The network 1165 may be implemented in a wireless fashion, e.g., using wireless protocols and technologies, such as WiFi, WiMax, etc. The network 1165 can also be a packet-switched network such as a local area network, wide area network, metropolitan area network, Internet network, or other similar type of network environment. The network 1165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 1101 is a PC, workstation, intelligent device or the like, the software in the memory 1110 may further include a basic input output system (BIOS) (omitted for simplicity). The BIOS is a set of essential software routines that initialize and test hardware at startup, start the OS 1111, and support the transfer of data among the hardware devices. The BIOS is stored in ROM so that the BIOS can be executed when the computer 1101 is activated.

When the computer 1101 is in operation, the processor 1105 is configured to execute software stored within the memory 1110, to communicate data to and from the memory 1110, and to generally control operations of the computer 1101 pursuant to the software. The process-driven feedback methods described herein and the OS 1111, in whole or in part, but typically the latter, are read by the processor 1105, perhaps buffered within the processor 1105, and then executed.

When the systems and methods described herein are implemented in software, as is shown in FIG. 12, it the methods can be stored on any computer readable medium, such as storage 1120, for use by or in connection with any computer related system or method. In the context of this document, a computer readable medium is an electronic, magnetic, optical, or other physical device or means that can contain or store a computer program for use by or in connection with a computer related system or method. The process-driven feedback methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the process-driven feedback methods are implemented in hardware, the process-driven feedback methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects include: an improvement in feedback generation on assets as fine-grained information are collected during the entire IT solution lifecycle, an increase in user productivity as the process of reporting assets changes to the repository is done automatically; a refinement of an assets search process as the classification reflects the usages across multiple IT solution; computation of the value of design assets which is today left on the final user will or replies on the on only the number of downloads; and creation of a multi-level validation process for assets changes as the person changing the asset might not be the one reporting the changes back to the repository.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for process-driven feedback for a digital asset, the method comprising:
   identifying the asset downloaded in a computer system from a repository operatively coupled to the computer system, and for a current project within the computer system for the current project;
   determining whether the asset has been consumed within the current project;
   determining feedback and changes between the asset prior to the current project and after the current project, the feedback providing automatic changes to the asset during a life cycle of the asset, and the feedback for the asset including at least one of feedback from an external forum, bug reports, service registry integration, defect tracking, process automation, feedback for metadata associate with the asset, the metadata being at least one of structured and non-structured tags stored in an assets feedback and reuse repository;

consolidating the feedback and the changes associated with the asset; and automatically generating feedback for the asset repository so that the feedback and changes are associated with the asset for comparison in a future project similar to the current project.

2. The method as claimed in claim 1 wherein changes to the asset includes changes to artifacts associated with the asset and links between assets.

3. The method as claimed in claim 1 wherein changes to the asset includes changes to a classification associated with the asset.

4. The method as claimed in claim 3 further comprising performing a classification synchronization for the asset, the classification synchronization being between at least one of the asset consumed in the current project and the asset consumed in a second project, and the asset from the repository and the asset from a second repository.

5. The method as claimed in claim 1 wherein analyzing the asset comprises detecting changes within the asset during the current project.

6. The method as claimed in claim 1 wherein consolidating feedback and changes associated with the asset includes consolidating metadata associated with the asset.

7. A computer program product for process-driven feedback for an asset in a computer system having an asset repository, the asset consumed in a current project, the computer program product including a non-transitory computer readable medium including instructions for causing a computer to implement a method, the method comprising:

identifying the asset downloaded for the project;

determining whether the asset has been consumed within the current project;

determining feedback and changes between the asset prior to the current project and after the current project, the feedback providing automatic changes to the asset during a life cycle of the asset, and the feedback for the asset including at least one of feedback from an external forum, bug reports, service registry integration, defect tracking, process automation, feedback for metadata associate with the asset, the metadata being at least one of structured and non-structured tags stored in an assets feedback and reuse repository;

consolidating the feedback and the changes associated with the asset; and automatically generating feedback for the asset repository so that the feedback and changes are associated with the asset for comparison in a future project similar to the current project.

8. The computer program product as claimed in claim 7 wherein changes to the asset includes changes to artifacts associated with the asset and links between assets.

9. The computer program product as claimed in claim 7 wherein changes to the asset includes changes to a classification associated with the asset.

10. The computer program product as claimed in claim 9 wherein the method further comprises performing a classification synchronization for the asset, the classification synchronization being between at least one of the asset consumed in the current project and the asset consumed in a second project, and the asset from the repository and the asset from a second repository.

11. The computer program product as claimed in claim 7 wherein analyzing the asset comprises detecting changes within the asset during the current project.

12. The computer program product as claimed in claim 7 wherein consolidating feedback and changes associated with the asset includes consolidating metadata associated with the asset.

13. A system for process-driven feedback for an asset within the system, the system comprising:

a processor;

an asset and feedback repository coupled to the processor, and storing feedback, the feedback providing automatic changes to the asset during a life cycle of the asset, and the feedback for the asset including at least one of feedback from an external forum, bug reports, service registry integration, defect tracking, process automation, feedback for metadata associate with the asset, the metadata being at least one of structured and non-structured tags stored in an assets feedback and reuse repository;

a project asset analyzer operatively coupled to the asset repository and to the processor;

a project asset history analyzer operatively coupled to the project asset analyzer and to the processor;

an assets changes comparator operatively coupled to the project asset analyzer and to the project asset history analyzer and to the processor; and a project-based asset feedback consolidator operatively coupled to the assets changes comparator.

14. The system as claimed in claim 13 wherein the assets changes comparator includes a classification comparator operatively coupled to the project asset analyzer, and configured to discover new classifications adopted for at least one of the asset and an artifact within a current project.

15. The system as claimed in claim 13 wherein the assets changes comparator includes an artifacts comparator configured to identify content changes of an artifact associated with the asset and to distinguish classes of changes associated with the asset.

16. The system as claimed in claim 13 wherein the assets changes comparator includes an asset comparator configured to discover if new artifacts have been added to the asset, and to discover if existing artifacts have been removed from the asset when consumed in the current project.

17. The system as claimed in claim 13 further comprising a classification mediator configured to synchronize classifications consumed by alternate projects and asset repositories.

18. The system as claimed in claim 13 wherein the processor includes a process having instructions for executing a method, comprising:

identifying the asset downloaded for the project;

determining whether the asset has been consumed within the current project;

determining feedback and changes between the asset prior to the current project and after the current project;

consolidating the feedback and the changes associated with the asset; and automatically generating feedback for the asset repository so that the feedback and changes are associated with the asset for comparison in a future project similar to the current project.

19. The system as claimed in claim 18 wherein the method further comprises performing a classification synchronization for the asset, the classification synchronization being between at least one of the asset consumed in the current project and the asset consumed in a second project, and the asset from the repository and the asset from a second repository.

\* \* \* \* \*